US012798004B2

(12) United States Patent
Chen et al.

(10) Patent No.: US 12,798,004 B2
(45) Date of Patent: Nov. 17, 2026

(54) JOINING STRUCTURE AND METHOD FOR MANUFACTURING SAME

(71) Applicant: Kobe Steel, Ltd., Kobe (JP)

(72) Inventors: Liang Chen, Kanagawa (JP); Kenichi Watanabe, Hyogo (JP); Kazuya Yasui, Hyogo (JP); Dongyong Shi, Hyogo (JP); Masao Hadano, Kanagawa (JP); Takayuki Kimura, Hyogo (JP); Reiichi Suzuki, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 56 days.

(21) Appl. No.: 18/323,903

(22) Filed: May 25, 2023

(65) Prior Publication Data

US 2023/0294205 A1 Sep. 21, 2023

Related U.S. Application Data

(62) Division of application No. 17/256,499, filed as application No. PCT/JP2019/021881 on May 31, 2019.

(30) Foreign Application Priority Data

Jun. 29, 2018 (JP) ................................ 2018-124515

(51) Int. Cl.
*B23K 26/244* (2014.01)
*B21D 22/00* (2006.01)
(Continued)

(52) U.S. Cl.
CPC ............ *B23K 26/244* (2015.10); *B21D 22/00* (2013.01); *B23B 3/04* (2013.01); *B23K 9/02* (2013.01);
(Continued)

(58) Field of Classification Search
CPC ...... B23K 26/244; B23K 9/02; B23K 26/242; B23K 26/348; B23K 31/022;
(Continued)

(56) References Cited

U.S. PATENT DOCUMENTS 5,821,493 A * 10/1998 Beyer .................. B23K 26/348 219/121.45
6,426,153 B1 * 7/2002 Duley .................. B23K 26/242 428/614
(Continued)

FOREIGN PATENT DOCUMENTS

CN 203649731 U 6/2014
JP 2000-197969 A 7/2000
(Continued)

OTHER PUBLICATIONS

Taizo, Kobashi et al. "Research on laser-arc hybrid welding of lap fillet joints of thin sheet," 2015, Welding International, pp. 399-408 (Year: 2015).*
(Continued)

*Primary Examiner* — Erwin J Wunderlich
(74) *Attorney, Agent, or Firm* — Oblon, McClelland, Maier & Neustadt, L.L.P.

(57) ABSTRACT

A method for manufacturing a joint structure formed by joining a first plate-shaped member and a second plate-shaped member having a shape that is longer in a longitudinal direction than in a lateral direction includes overlapping the first plate-shaped member and the second plate-shaped member, after the overlapping, joining each of both edge portions of the second plate-shaped member by forming a weld metal along the longitudinal direction to the first plate-shaped member. The weld metal extends further outward in the lateral direction than the edge portions of the second plate-shaped member, in which the weld metal is formed by a hybrid welding in which a laser is added as a
(Continued)

heat source during arc welding such that the weld metal extends around both of the edge portions of the second plate-shaped member along the longitudinal direction.

3 Claims, 4 Drawing Sheets

(51) Int. Cl.

| | |
|---|---|
| ***B23B 3/04*** | (2006.01) |
| ***B23K 9/02*** | (2006.01) |
| ***B23K 26/242*** | (2014.01) |
| ***B23K 26/346*** | (2014.01) |
| ***B23K 26/348*** | (2014.01) |
| ***B23K 31/02*** | (2006.01) |
| ***B62D 25/04*** | (2006.01) |
| ***B62D 27/02*** | (2006.01) |
| ***F16B 5/08*** | (2006.01) |
| *B23K 101/00* | (2006.01) |
| *B23K 103/04* | (2006.01) |

(52) U.S. Cl.
CPC .......... *B23K 26/242* (2015.10); *B23K 26/348* (2015.10); *B23K 31/022* (2013.01); *B62D 27/02* (2013.01); *B23K 26/346* (2015.10); *B23K 2101/006* (2018.08); *B23K 2103/04* (2018.08); *B62D 25/04* (2013.01); *B62D 27/023* (2013.01); *F16B 5/08* (2013.01)

(58) Field of Classification Search
CPC .......... B23K 2101/006; B23K 2103/04; B21D 22/00; B23B 3/04; B62D 27/02; B62D 25/04; B62D 27/023; F16B 5/08
See application file for complete search history.

(56) References Cited

U.S. PATENT DOCUMENTS

| | | | | |
|---|---|---|---|---|
| 11,364,707 | B2 * | 6/2022 | Fujita | B21D 22/022 |
| 11,786,992 | B2 * | 10/2023 | Muto | B23K 10/02 219/121.63 |
| 11,975,764 | B2 * | 5/2024 | Higai | B62D 25/00 |
| 12,528,110 | B2 * | 1/2026 | Ito | B21D 22/022 |
| 2002/0003054 | A1 * | 1/2002 | Kamada | B21D 28/06 180/69.2 |
| 2002/0124557 | A1 * | 9/2002 | Klein | F01N 13/1838 60/301 |
| 2003/0087117 | A1 | 5/2003 | Duley et al. | |
| 2005/0189791 | A1 * | 9/2005 | Chernoff | B62D 25/2036 296/193.07 |
| 2009/0250967 | A1 * | 10/2009 | Bodin | B21D 53/88 72/342.7 |
| 2014/0147693 | A1 * | 5/2014 | Yasuyama | B32B 3/00 428/603 |
| 2015/0043962 | A1 | 2/2015 | Miyazaki et al. | |
| 2015/0174702 | A1 * | 6/2015 | Fujimoto | B23K 26/32 219/121.64 |
| 2015/0314363 | A1 * | 11/2015 | Nelson | B23K 11/115 219/78.16 |
| 2017/0355407 | A1 * | 12/2017 | Lindgren | B62D 65/024 |
| 2018/0009050 | A1 * | 1/2018 | Tokita | B21D 53/88 |
| 2018/0029166 | A1 * | 2/2018 | Kodama | B23K 9/0256 |
| 2018/0126435 | A1 * | 5/2018 | Egawa | B23P 15/00 |
| 2018/0126437 | A1 | 5/2018 | Miyazaki et al. | |
| 2018/0339368 | A1 * | 11/2018 | Shiozaki | B23K 9/02 |
| 2019/0009367 | A1 * | 1/2019 | Suzuki | B21D 35/007 |
| 2019/0010570 | A1 | 1/2019 | Suzuki et al. | |
| 2019/0168811 | A1 | 6/2019 | Yamazaki et al. | |
| 2019/0291216 | A1 * | 9/2019 | Kikuchi | B23K 15/0053 |
| 2019/0300060 | A1 * | 10/2019 | Otsuka | B21D 37/12 |
| 2020/0290149 | A1 | 9/2020 | Fujimoto | |
| 2020/0398378 | A1 | 12/2020 | Fujiwara et al. | |
| 2021/0283715 | A1 * | 9/2021 | Muto | B23K 26/21 |
| 2023/0382463 | A1 * | 11/2023 | Abe | B21D 35/006 |

FOREIGN PATENT DOCUMENTS

| | | | |
|---|---|---|---|
| JP | 2001-507993 | A | 6/2001 |
| JP | 2002-160020 | A | 6/2002 |
| JP | 2003-268804 | A | 9/2003 |
| JP | 2011-088484 | A | 5/2011 |
| JP | 2013-220445 | A | 10/2013 |
| JP | 2014-15206 | A | 1/2014 |
| JP | 2017-189781 | A | 10/2017 |
| KR | 10-2008-0019823 | A | 3/2008 |

OTHER PUBLICATIONS

International Search Report issued on Aug. 20, 2019, in PCT/JP2019/021881 filed on May 31, 2019, (with English translation), 5 pages.
Written Opinion issued on Aug. 20, 2019, in PCT/JP2019/021881 filed on May 31, 2019, (with English translation), 11 pages.
Extended European Search Report issued Jul. 19, 2021, in European Patent Application No. 19825575.4, 7 pages.
Weng Yuqing, et al., "Strategic Research on Application of Special Steel in Advanced Equipment Manufacturing Industry", Consulting and Research Project of Chemical. Metallurgy and Materials Engineering department of Chinese Academy of Engineering, 2012, pp. 86-87 (8 total pages, with English translation).

* cited by examiner

JOINING STRUCTURE AND METHOD FOR MANUFACTURING SAME

CROSS REFERENCE TO RELATED APPLICATIONS

The present application is a divisional of U.S. patent application Ser. No. 17/256,499, filed on Dec. 28, 2020, which is a 35 U.S.C. § 371 national stage patent application of international patent application PCT/JP2019/021881, filed on May 31, 2019, which claims priority to Japanese patent application JP 2018-124515, filed on Jun. 29, 2018.

TECHNICAL FIELD

The present invention relates to a joint structure and a method for manufacturing the same, more specifically relates to a joint structure suitable for, for example, a structural member for an automobile and a method for manufacturing the same.

BACKGROUND ART

In recent years, in order to enhance collision safety while reducing weight of a vehicle body with reducing a $CO_2$ emission amount as an object, a method of using a high tensile steel plate or partially reinforcing a necessary place with a reinforcing material is known. Patent Literatures 1 and 2 disclose a joint body manufactured by joining two metal members, that is, a first metal member and a second metal member by laser welding. Patent Literature 1 discloses that a welding mark of the laser welding is a pair or plural pairs of straight lines parallel to each other. Patent Literature 2 discloses that a welding mark of the laser welding has a plurality of C-shaped portions arranged continuously, and parts of the adjacent C-shaped portions overlap.

CITATION LIST

Patent Literature

Patent Literature 1: JP-A-2001-507993
Patent Literature 2: JP-A-2014-15206

SUMMARY OF INVENTION

Technical Problem

In the joint bodies disclosed in Patent Literature 1 or 2, there is still room for improvement in joining strength between the first metal member and the second metal member. Therefore, the joint bodies are not suitable for processing by, for example, hot stamping (hot press). That is, when these joint bodies are processed by hot stamping, due to insufficient joining strength, particularly insufficient joining strength of a joint portion between the first metal member and an edge portion of the second metal member, the first metal member and the second metal member may be partially or entirely peeled off from the edge portion.

Further, when an external force is applied to the hot stamping component at the time of a collision accident, the first metal member and the second metal member can be peeled off, so that a sufficient reinforcing effect cannot be obtained. Further, since laser processing equipment is expensive, it is a factor that increases product cost.

The present invention has been made in view of the problems described above, and an object thereof is to provide a joint structure that has high joining strength and can be manufactured at low cost, and a method for manufacturing the same.

Solution to Problem

The present invention includes a configuration of the following (1).

(1) A joint structure formed by joining a first plate-shaped member made of steel and a second plate-shaped member made of steel that is overlapped on the first plate-shaped member and that is formed in a long shape, wherein a surface of the first plate-shaped member and both edge portions of the second plate-shaped member along a longitudinal direction are joined by a weld metal.

A preferable embodiment of the present invention includes configurations of the following (2) to (5).

(2) The joint structure according to (1), wherein a bent portion is formed on an overlapping surface between the first plate-shaped member and the second plate-shaped member.

(3) The joint structure according to (1) or (2), wherein the first plate-shaped member and the second plate-shaped member are further joined to each other in an overlapping surface between the first plate-shaped member and the second plate-shaped member.

(4) The joint structure according to any one of (1) to (3), wherein at least one of the first plate-shaped member and the second plate-shaped member is a steel material for hot stamping.

(5) The joint structure according to any one of (1) to (4), which is a structural member for an automobile.

The present invention includes a configuration of the following (6).

(6) A method for manufacturing a joint structure formed by joining a first plate-shaped member made of steel and a second plate-shaped member made of steel that is overlapped on the first plate-shaped member and that is formed in a long shape, the method including:

a step of overlapping the first plate-shaped member and the second plate-shaped member; and a welding step of joining each of both edge portions of the second plate-shaped member along a longitudinal direction to the first plate-shaped member by an arc welding or a laser-arc hybrid welding.

A preferable embodiment of the present invention includes configurations of the following (7) to (10).

(7) The method for manufacturing a joint structure according to (6), wherein a bending is performed on an overlapping surface between the first plate-shaped member and the second plate-shaped member.

(8) The method for manufacturing a joint structure according to (6) or (7), further comprising joining the first plate-shaped member and the second plate-shaped member to each other in the overlapping surface between the first plate-shaped member and the second plate-shaped member by any welding of a laser welding, a plasma welding, a TIG welding, or a laser-TIG hybrid welding.

(9) The method for manufacturing a joint structure according to any one of (6) to (8), wherein at least one of the first plate-shaped member and the second plate-shaped member is a steel material for hot stamping.

(10) The method for manufacturing a joint structure according to any one of (6) to (9), wherein the joint structure is a structural member for an automobile.

Advantageous Effects of Invention

According to the joint structure and the method for manufacturing the same of the present invention, the joint structure has high joining strength, and the joint structure can be manufactured at low cost.

DESCRIPTION OF EMBODIMENTS

Embodiments of a joint structure according to the present invention is described in detail based on the drawings.

Figure 1:
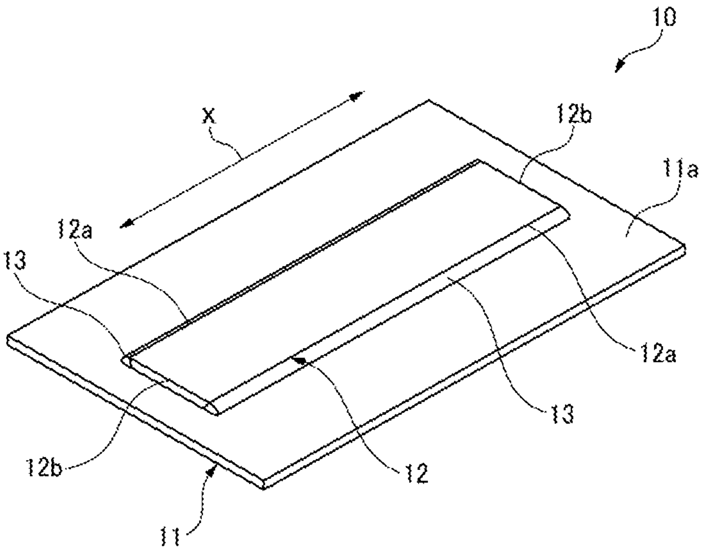
FIG. 1 is a perspective view of a joint structure according to an embodiment of the present invention.

FIG. 1 is a perspective view of a joint structure manufactured by a method for manufacturing the joint structure according to the present embodiment. As shown in FIG. 1, the joint structure 10 includes a first plate-shaped member 11 made of steel and a second plate-shaped member 12 made of steel as a reinforcing material, which is formed into a long shape narrower than the first plate-shaped member 11.

The second plate-shaped member 12 is overlapped on a surface 11*a* of the first plate-shaped member 11. Both edge portions 12*a* along a longitudinal direction (X direction in the drawing) of the second plate-shaped member 12 and the surface 11*a* of the first plate-shaped member 11 are joined by a weld metal (bead) 13 formed by an arc welding or a laser-arc hybrid welding. The weld metal (bead) 13 may be formed continuously along both the edge portions 12*a* or may be formed intermittently. However, as described later, in the case where bending is performed along an imaginary line B (see FIG. 2A) set on an overlapping surface 14, the weld metal (bead) 13 is preferably formed continuously in order to correspond to a stress generated at the time of bending.

A material of the first plate-shaped member 11 and the second plate-shaped member 12, which are made of steel, is not particularly limited as long as it is pure iron and iron alloy, and examples thereof include mild steel, carbon steel, and stainless steel.

The first plate-shaped member 11 and the second plate-shaped member 12 can also be subjected to surface treatment for forming a coating such as an electrically low element or work piece, an insulating substance, and a passivation film in order to preventing rust, and the like. Examples thereof include zinc plating, chromium plating, nickel plating, aluminum plating, tin plating, resin coating, and ceramic coating.

Both the edge portions 12*a* of the second plate-shaped member 12 and the surface 11*a* of the first plate-shaped member 11 are joined with a filler metal (welding wire) by an arc welding or a laser-arc hybrid welding. Therefore, both the edge portions 12*a* of the second plate-shaped member 12 can be joined in a wide area, and joining strength is improved as compared with joining by a spot welding, a laser welding, or the like. Further, by appropriately selecting components of the filler metal, it is possible to design joining strength at a joint portion. As for a material of the filler metal, a welding wire or a welding rod which is generally used is applicable as long as the weld metal 13 is a Fe-based alloy.

In the laser-arc hybrid welding, a laser is added as a heat source in an arc welding method as a heat source and wire supply method. The method is advantageous in that the welding speed is higher than that of an ordinary arc welding method.

In the embodiment shown in FIG. 1, both the edge portions 12*a* along the longitudinal direction of the second plate-shaped member 12 are welded to the first plate-shaped member 11 by arc welding or laser-arc hybrid welding, but edge portions 12*b* extending in a direction (short direction) which intersect the both edge portions 12*a* of the second plate-shaped member 12 may also be welded to the first plate-shaped member 11 by an arc welding or a laser-arc hybrid welding. In this way, by welding the second plate-shaped member 12 to the first plate-shaped member 11 over an entire periphery of the edge portions 12*a* and 12*b*, water or the like penetrating into a gap between the first plate-shaped member 11 and the second plate-shaped member 12 can be prevented, and corrosion resistance is significantly improved.

The first plate-shaped member 11 and the second plate-shaped member 12 welded by an arc welding or a laser-arc hybrid welding may be bent to form a formed article. Depending on a degree of bending or strength required for the joint structure 10, in the case where only both edge portions 12*a* of the second plate-shaped member 12 are welded by an arc welding or a laser-arc hybrid welding, the joint structure 10 may have insufficient joining strength or bending strength. In particular, when a width of the second plate-shaped member 12 is wide and a distance between the two edge portions 12*a* is large, strength may be insufficient.

Figure 2A:
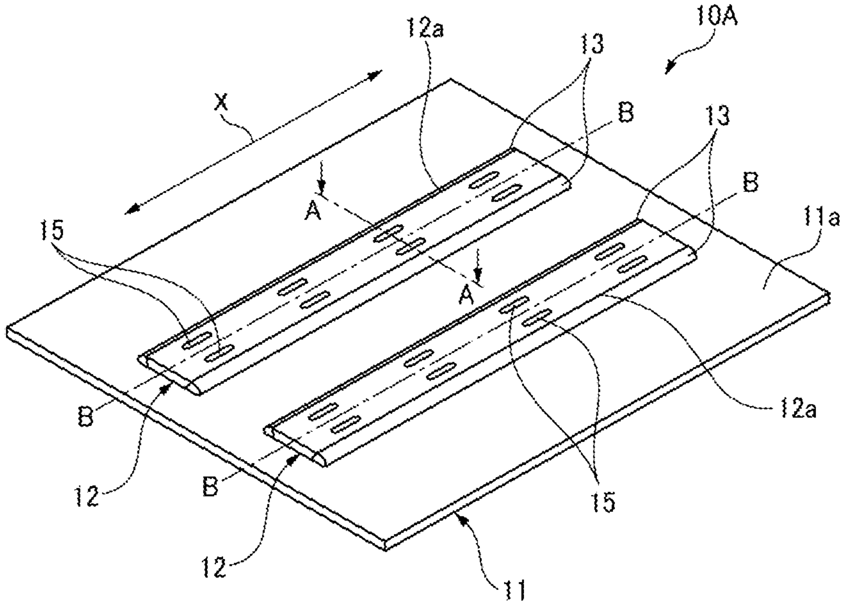
FIG. 2A is a perspective view of a modification of the joint structure according to the embodiment of the present invention.
Figure 2B:
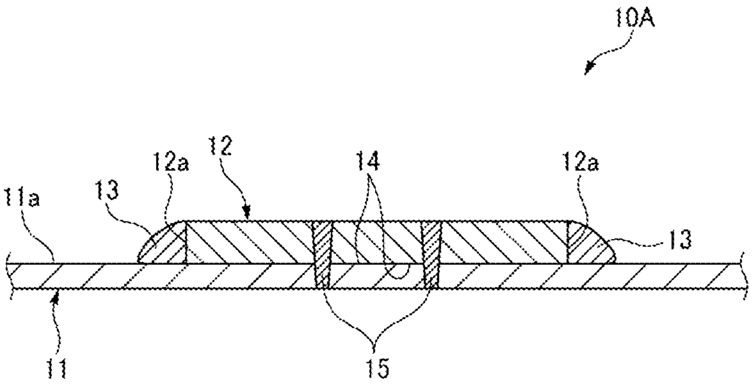
FIG. 2B is a cross-sectional view taken along a line A-A of FIG. 2A.

FIG. 2A is a perspective view of a joint structure 10A according to a modification in which the front surface 11*a* of the first plate-shaped member 11 and the both edge portions 12*a* of the second plate-shaped member 12 are joined by an arc welding or a laser-arc hybrid welding, and the overlapping surfaces 14 of the first plate-shaped member 11 and the second plate-shaped member 12 are further joined by a laser welding. FIG. 2B is a cross-sectional view taken along a line A-A of FIG. 2A.

In the joint structure 10A according to the modification, as shown in FIG. 2A and FIG. 2B, the overlapping surfaces 14 of the first plate-shaped member 11 and the second plate-shaped member 12, in which both the edge portions 12*a* are joined to the first plate-shaped member 11 by an arc welding or a laser-arc hybrid welding, are joined by a laser welding by plural pairs of joint portions 15 arranged along the longitudinal direction (X direction in FIG. 2A) of the second plate-shaped member 12 and formed to face to each other in a width direction of the second plate-shaped member 12.

This further improves the joining strength between the first plate-shaped member 11 and the second plate-shaped member 12.

Figure 3:
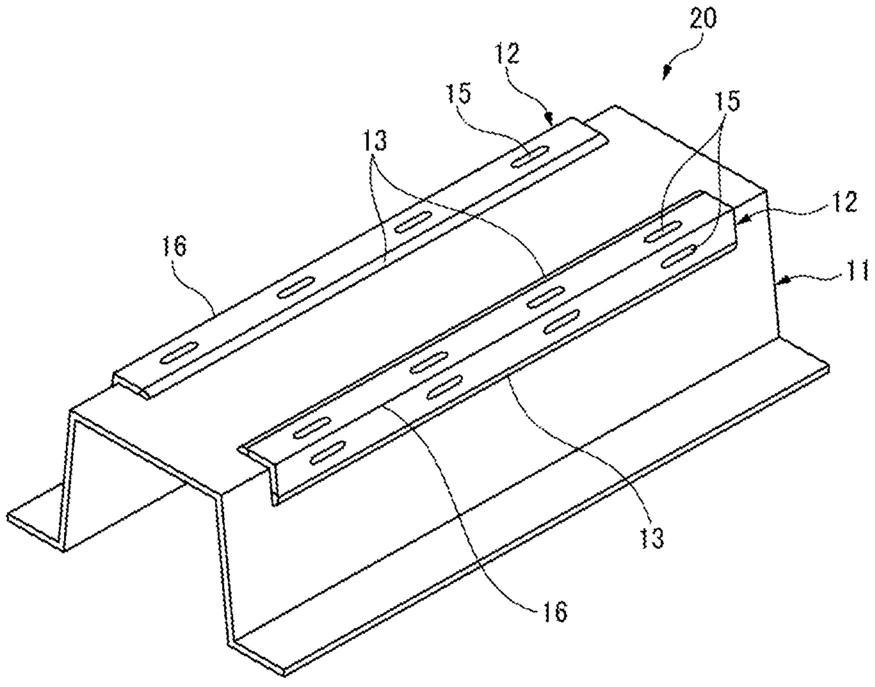
FIG. 3 is a perspective view of the joint structure bent along a line B-B of FIG. 2A.

The joint structure 10A thus formed is bent along an imaginary line B (see FIG. 2A) set on the overlapping surface 14, and is processed into a formed article 20 shown in FIG. 3 by forming a bent portion 16.

The bent portion 16 (imaginary line B) is preferably set so as to pass substantially the center of a pair of the joint portions 15 formed to face to each other in the width direction of the second plate-shaped member 12. Accordingly, a force acting at the time of bending acts equally on the left and right to improve shape accuracy of the formed article 20.

Accompanied with bending, a shearing force acts on the joint portion between the first plate-shaped member 11 and the second plate-shaped member 12. In the case where the first plate-shaped member 11 and the second plate-shaped member 12 are joined only by a spot welding or a laser welding, the joining strength of the edge portions 12*a* of the second plate-shaped member 12 with the first plate-shaped member 11 may be weak, and the second plate-shaped member 12 may be peeled off from the edge portions 12*a*.

However, in the joint structure 10A of the embodiment, the first plate-shaped member 11 and both the edge portions 12*a* of the second plate-shaped member 12 are joined by an arc welding or a laser-arc hybrid welding, and the overlapping surfaces 14 of the first plate-shaped member 11 and the second plate-shaped member 12 are joined in a plurality of portions by a laser welding. Therefore, the joining strength is high, and the first plate-shaped member 11 and the second plate-shaped member 12 are prevented from being peeled off by bending.

In the case where the joint structures 10 and 10A are structural members for an automobile requiring high strength such as pillars, it is preferable to use a steel material for hot stamping as the first plate-shaped member 11 and the second plate-shaped member 12. In the case where the joint structures 10 and 10A are made of the steel material for hot stamping, bending is performed by hot stamping (hot working) that is processed in a state of heating to a temperature of 800° C. or higher. Accordingly, accurate forming is possible.

Figure 4:
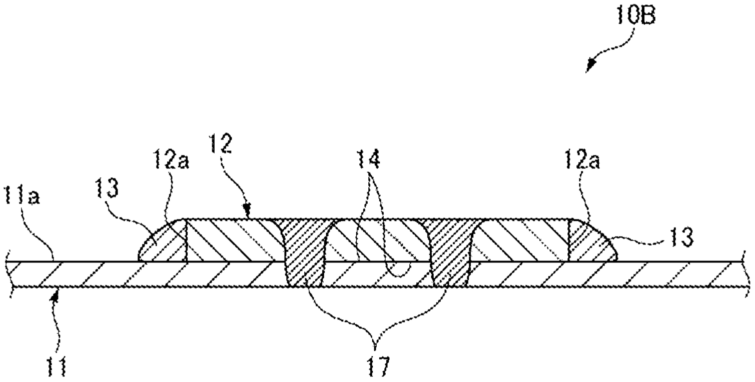
FIG. 4 is a cross-sectional view of another modification of the joint structure according to the embodiment of the present invention.

FIG. 4 is a cross-sectional view of a joint structure according to another modification in which the overlapping surfaces 14 of the first plate-shaped member 11 and the second plate-shaped member 12, in which the edge portions 12*a* are joined by an arc welding or a laser-arc hybrid welding, are joined by a plasma welding, a TIG welding, or a laser-TIG hybrid welding.

In a joint structure 10B of the modification, the first plate-shaped member 11 and both the edge portions 12*a* of the second plate-shaped member 12 are joined with the weld metal 13 formed by an arc welding or a laser-arc hybrid welding, and the overlapping surfaces 14 of the first plate-shaped member 11 and the second plate-shaped member 12 are further joined firmly in a plurality of portions by joint portions 17 formed by a plasma welding, a TIG welding, or a laser-TIG hybrid welding.

In this way, in the first plate-shaped member 11 and the second plate-shaped member 12, both the edge portions 12*a* are joined to the first plate-shaped member 11 by an arc welding or a laser-arc hybrid welding, and the overlapping surfaces 14 of the first plate-shaped member 11 and the second plate-shaped member 12 are further joined firmly in a plurality of portions by any welding of a laser welding, a plasma welding, a TIG welding, and laser-TIG hybrid welding, so that the first plate-shaped member 11 and the second plate-shaped member 12 can be formed by hot stamping and are suitably used as the structural member for an automobile.

In the laser-TIG hybrid welding, a laser is added as a heat source in a TIG welding method as a heat source and wire supply method. The method is advantageous in that penetration (penetrability of two plates) is deeper and the welding speed is higher than those of an ordinary arc welding method.

Figure 5:
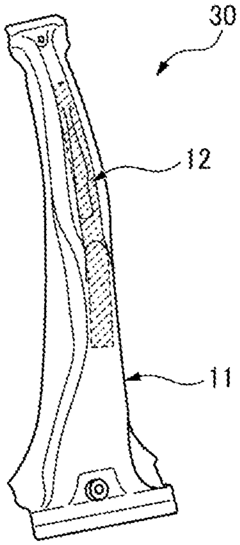
FIG. 5 is a perspective view showing an example of a B pillar manufactured by hot-stamping the joint structure according to the embodiment of the present invention.

For example, FIG. 5 shows an example of a B pillar 30 (an example of the structural member for an automobile) manufactured by processing the joint structures 10, 10A, and 10B with hot stamping. The B pillar 30 is formed by joining one second plate-shaped member 12 by welding to a part of the first plate-shaped member 11 required for reinforcement and then integrally forming them by hot stamping.

Figure 6:
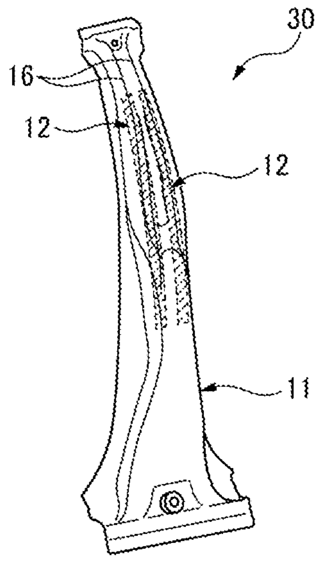
FIG. 6 is a perspective view showing another example of a B pillar manufactured by hot stamping the joint structure according to the embodiment of the present invention.

The B pillar 30 shown in FIG. 6 is formed by joining two second plate-shaped members 12 to the first plate-shaped member 11 at positions which are ridge line portions of the B pillar 30, respectively, and bending the first plate-shaped member 11 and the second plate-shaped members 12 by hot stamping on the overlapping surface 14 between the first plate-shaped member 11 and the second plate-shaped member 12.

Examples of the structural member for an automobile to which the joint structures 10, 10A, and 10B can be applied include a side sill, a floor cross member, a roof side rail, and a center tunnel cover other than the B pillar 30.

The present invention is not limited to the embodiments and modifications described above, and modifications, improvements, or the like can be made as appropriate.

As described above, the present description discloses the following matters.

(1) A joint structure formed by joining a first plate-shaped member made of steel and a second plate-shaped member made of steel that is overlapped on the first plate-shaped member and that is formed in a long shape, wherein a surface of the first plate-shaped member and both edge portions of the second plate-shaped member along a longitudinal direction are joined by a weld metal.

According to the configuration, it is possible to manufacture a joint structure having high joining strength at low cost.

(2) The joint structure according to (1), wherein a bent portion is formed on an overlapping surface between the first plate-shaped member and the second plate-shaped member.

According to the configuration, it is possible to manufacture a formed article whose strength is reinforced by bending the joint structure in which the first plate-shaped member and the second plate-shaped member are joined by welding.

(3) The joint structure according to (1) or (2), wherein the first plate-shaped member and the second plate-shaped member are further joined to each other in an overlapping surface between the first plate-shaped member and the second plate-shaped member.

According to the configuration, it is possible to more firmly join the first plate-shaped member and the second plate-shaped member.

(4) The joint structure according to any one of (1) to (3), wherein at least one of the first plate-shaped member and the second plate-shaped member is a steel material for hot stamping.

According to the configuration, it is possible to form the joint structure with an ultra-high strength steel plate.

(5) The joint structure according to any one of (1) to (4), which is a structural member for an automobile.

According to the configuration, it is possible to manufacture the joint structure that can be used as a structural member for an automobile.

(6) A method for manufacturing a joint structure formed by joining a first plate-shaped member made of steel and a second plate-shaped member made of steel that is overlapped on the first plate-shaped member and that is formed in a long shape, the method including:

a step of overlapping the first plate-shaped member and the second plate-shaped member; and a welding step of joining each of both edge portions of the second plate-shaped member along a longitudinal direction to the first plate-shaped member by an arc welding or a laser-arc hybrid welding.

According to the configuration, it is possible to manufacture the joint structure with high joining strength at low cost by bonding the first plate-shaped member and the second plate-shaped member by an arc welding or a laser-arc hybrid welding.

(7) The method for manufacturing a joint structure according to (6), wherein a bending is performed on an overlapping surface between the first plate-shaped member and the second plate-shaped member.

According to the configuration, it is possible to manufacture a formed article whose strength is reinforced, by bending the joint structure in which the first plate-shaped member and the second plate-shaped member are joined by welding.

(8) The method for manufacturing a joint structure according to (6) or (7), further comprising joining the first plate-shaped member and the second plate-shaped member to each other in the overlapping surface between the first plate-shaped member and the second plate-shaped member by any welding of a laser welding, a plasma welding, a TIG welding, or a laser-TIG hybrid welding.

According to the configuration, it is possible to more firmly join the first plate-shaped member and the second plate-shaped member.

(9) The method for manufacturing a joint structure according to any one of (6) to (8), wherein at least one of the first plate-shaped member and the second plate-shaped member is a steel material for hot stamping.

According to the configuration, it is possible to form the joint structure with an ultra-high strength steel plate.

(10) The method for manufacturing a joint structure according to any one of (6) to (9), wherein the joint structure is a structural member for an automobile.

According to the configuration, it is possible to manufacture the joint structure that can be used as a structural member for an automobile.

Although the embodiments are described above with reference to the drawings, it is needless to say that the present invention is not limited to such examples. It will be apparent to those skilled in the art that various changes and modifications may be conceived within the scope of the claims. It is also understood that various changes and modifications belong to the technical scope of the present invention. Constituent elements in the embodiments described above may be combined freely within a range not departing from the spirit of the present invention.

The present application is based on Japanese Patent Application No. 2018-124515 filed on Jun. 29, 2018, the contents of which are incorporated herein by reference.

REFERENCE SIGNS LIST

10, 10A, 10B joint structure
11 first plate-shaped member (steel material for hot stamping)
11*a* surface
12 second plate-shaped member (steel material for hot stamping)
12*a*, 12*b* edge portion
13 weld metal (bead)
14 overlapping surface
15 joint portion
16 bent portion
17 joint portion
20 formed article (structural member for automobile)
30 B pillar

The invention claimed is:

1. A method for manufacturing a joint structure formed by joining a first plate-shaped member made of steel and a second plate-shaped member made of steel, the second plate-shaped member having a shape that is longer in a longitudinal direction than in a lateral direction, and the second plate-shaped member includes two edge portions extending in the longitudinal direction, the method comprising:

overlapping the first plate-shaped member and the second plate-shaped member by placing the second plate-shaped member on the first plate-shaped member;

after the overlapping, joining each of both edge portions of the second plate-shaped member by forming a weld metal along all of the edge portions of the second plate-shaped member in the longitudinal direction to the first plate-shaped member, and the weld metal extends further outward in the lateral direction than the edge portions of the second plate-shaped member, the weld metal being a Fe-based alloy formed by arc welding such that the weld metal extends around both of the edge portions of the second plate-shaped member along the longitudinal direction such that the weld metal extends continuously over an entire periphery of the edge portions along the longitudinal direction of the second plate-shaped member;

joining the first plate-shaped member and the second plate-shaped member to each other in an overlapping surface between the first plate-shaped member and the second plate-shaped member by plural pairs of joint portions that penetrate through the first plate-shaped member and the second plate-shaped member to a back surface of the first plate-shaped member that is opposite to a front surface of the first plate-shaped member, wherein the plural pairs of joint portions are formed by any one welding selected from a group consisting of a laser welding, a plasma welding, a TIG welding, and laser-TIG hybrid welding; and after the joining of the first plate-shaped member and the second plate-shaped member, bending a welded assembly of the first plate-shaped member and the second plate-shaped member to form a bent portion such that the bent portion passes at a center of the joint portions.

2. The method for manufacturing a joint structure according to claim 1, wherein at least one of the first plate-shaped member and the second plate-shaped member is a steel material for hot stamping.

3. The method for manufacturing a joint structure according to claim 1, wherein the joint structure is a structural member for an automobile.

* * * * *